2 Sheets—Sheet 1.

R. S. CATHCART.

Assignor to STRAUB MILL COMPANY.

Millstone Driver.

No. 8,933. Reissued Oct. 14, 1879.

Witnesses
Red. G. Dieterich
George Binkenburg

Inventor
R. S. Cathcart
per D. C. Allen
Attorney

N. PETERS, PHOTO-LITHOGRAPHER, WASHINGTON, D. C.

R. S. CATHCART.

Assignor to STRAUB MILL COMPANY.

Millstone Driver.

No. 8,933. Reissued Oct. 14, 1879.

Witnesses
Rud. G. Dieterich
George Binkenburg

Inventor
R. S. Cathcart
Per. J. E. Allen
attorney

N. PETERS, PHOTO-LITHOGRAPHER, WASHINGTON, D. C.

UNITED STATES PATENT OFFICE.

RODNEY S. CATHCART, OF DALLAS, TEXAS, ASSIGNOR TO STRAUB MILL COMPANY, OF CINCINNATI, OHIO.

IMPROVEMENT IN MILLSTONE-DRIVERS.

Specification forming part of Letters Patent No. 160,874, dated March 16, 1875; Reissue No. 8,933, dated October 14, 1879; application filed May 19, 1879.

*To all whom it may concern:*

Be it known that I, RODNEY S. CATHCART, formerly of Cincinnati, in the county of Hamilton and State of Ohio, but now of Dallas, county of Dallas, and State of Texas, have invented certain new and useful Improvements in Hanging Millstones; and I do hereby declare the following to be a full, clear, and exact description of the same, reference being made to the accompanying drawings, forming a part of this specification, and in which—

Figure 1:
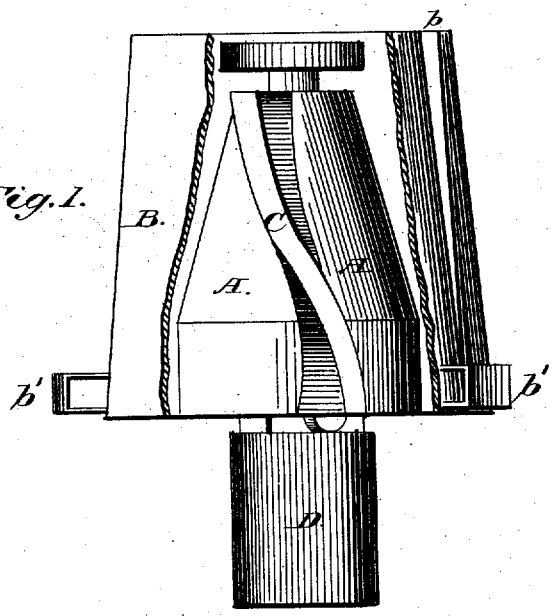
Figure 2:
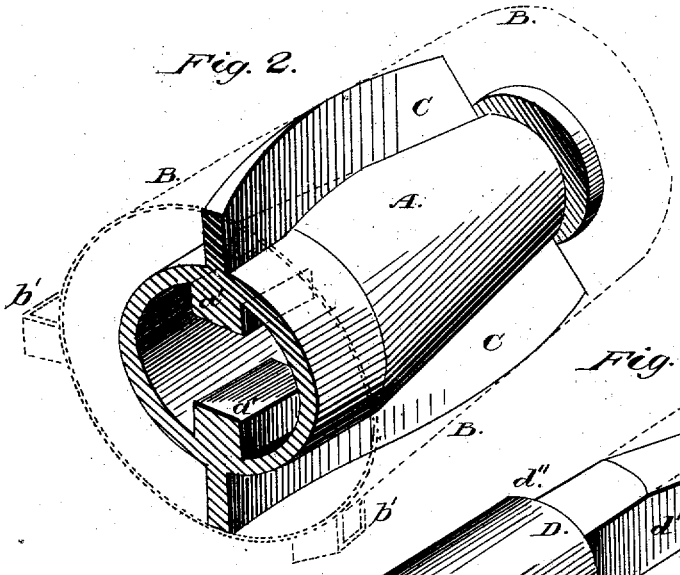
Figure 3:
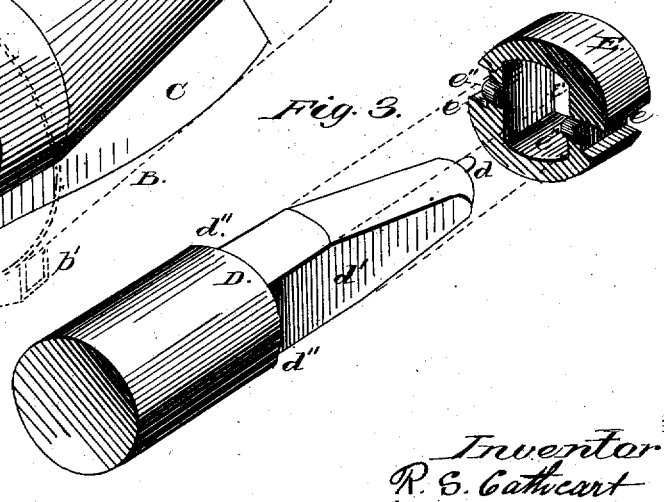
Figure 4:
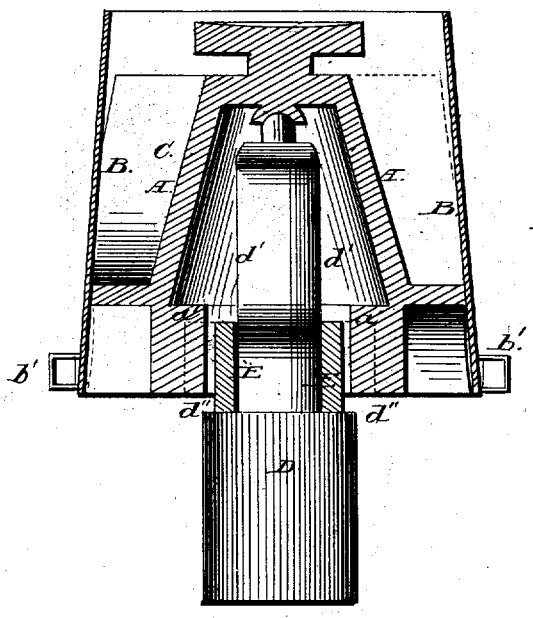
Figure 5:
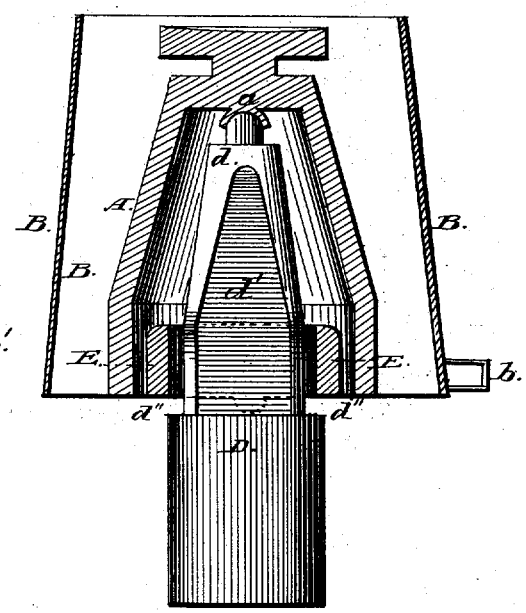

Figure 1 is a side elevation of my improved device as arranged for use, a portion being broken away to show the interior thereof. Fig. 2 is a perspective view of the bail. Fig. 3 is a like view of the upper portion of the spindle and the lower side of the driver. Figs. 4 and 5 are vertical central sections, at right angles with each other, of my improved device.

My invention relates to improvements in the class of devices for transmitting motion from a mill-spindle to the grinding-stone suspended thereby; and to this end the invention consists, principally, in the combination, with a mill-spindle and a bail having its point of suspension above the driver or on the top end of the spindle, of an intermediate rocking driver having an enlarged central eye surrounding said spindle, whereby the runner-stone is adapted to oscillate without interfering with the movement of the spindle, maintaining a free and true balance, and at all times retaining its parallelism with the bed-stone.

It also consists in the construction and combination of the mill-spindle, driver, and bail, as will be hereinafter fully described.

In the annexed drawings, A represents the bail, which has, preferably, a general conical form, and has its inner side hollowed out from beneath in substantially the same shape as its exterior. An eye, B, having the usual exterior shape, surrounds the bail A, and is connected therewith by means of two or more radial flanges, C, which extend between said parts, and vertically are formed upon spiral lines. Two or more radial vertical flanges, *b*, are formed upon the outer surface of the eye B, for the purpose of increasing its strength, while at suitable points upon its lower portion are provided lugs *b'*, for connecting said eye to or with a runner.

Within the bail A, at the upper end, is provided a semi-spherical socket, *a*, for the reception of a correspondingly-shaped pivot or cock-head, *d*, that is formed upon the upper end of the spindle D, which pivot or cock-head and socket sustain the weight of the runner, and permit the latter to oscillate sufficiently to cause its lower or grinding surface to adapt itself to the contiguous face of the stationary or bed stone. At opposite sides, and at the lower end of the cavity of the bail, are two radial vertical lugs, *a'*, which are loosely embraced by corresponding recesses *e*, that are formed within the edges of a driver, E, which driver has the form of a round disk, and is somewhat less in diameter than the lower end of said cavity, so as to be capable of lateral motion in a line with said lugs. The spindle D is flattened upon opposite sides, as seen in Fig. 3, from a point near its upper end downward somewhat below the bottom of the bail, and such flattened portion is contained within a slot, *e'*, that is formed in and through the driver E, which slot is lengthened or enlarged, so as to enable the driver to move laterally or endwise in a line having a right angle to the line of the recesses *e*, for the purpose of effecting an equal bearing upon the bail before the force is communicated to the runner-stone. Two half-round lugs, *e''*, formed upon the lower face of the driver, with their axis in a line with the recesses *e*, rest upon the shoulders *d''*, which form the lower ends of the faces *d'*, and furnish bearings for said driver to move to and fro upon said shoulders, and also rock thereon without unnecessary friction when rendered necessary by the oscillation of the runner.

The device described is used in the ordinary manner, and possesses the following-named advantages: First, it furnishes a pivotal connection, which enables the runner to oscillate freely without interfering with the movement of the spindle, and as the tipping of the bail or spindle changes their relative positions, the driver will rock on its bearings and maintain a direct connection between the bail and spindle, thus allowing the runner-stone to always retain its parallelism, and without any undue friction or binding of the parts or interfering with their movements; second, it possesses unusual strength and durability, and is not liable to become deranged by wear or breakage; third, the bearing and moving parts being entirely covered, no liability exists to interference with free operation by the falling or lodgment of grain; fourth, the spiral shape of the flanges employed for connecting the bail and eye, besides affording additional strength to said parts, facilitates feeding of grain to the stone.

I am aware that a ring centrally hung in the eye of a runner-stone by drivers passing horizontally through said stone, and the ring pivoted to a bolt or pin passing transversely through the spindle on a horizontal line with the drivers, whereby said ring and stone are adapted to oscillate on said rod or pin, is old. Such construction is, however, obviously objectionable, for the reason that the point of suspension of the runner-stone is on a line with the drivers, and in consequence thereof the weight of the runner-stone is supported by the pin or rod passing through the spindle; and as said pin or rod passing through the spindle tends to weaken it, all the weight of the runner-stone is brought on the weakest point of the spindle.

Having thus fully set forth the nature and merits of my invention, what I claim as new is—

1. The combination, with a mill-spindle and a bail having its point of suspension above the driver or on the top end of spindle, of an intermediate rocking driver having an enlarged central eye surrounding said spindle, substantially as and for the purpose specified.

2. The combination, with a mill-spindle and a bail having its point of suspension above the driver or on the top end of spindle, of a rocking driver mounted on bearings formed around said spindle, substantially as and for the purpose specified.

3. In combination with the hollow bail A, provided with the radially inward-projecting lugs $a'$, and with the spindle D, having the flattened portions $d'$, the driver E, fitted loosely upon said spindle and provided with recesses $e$, which embrace said lugs $a'$, substantially as and for the purpose specified.

4. In combination with the spindle D, provided with the flattened portions $d'$ and shoulders $d''$, the driver E, having a central slot, $e'$, which embraces said spindle, and the lugs $e''$, that bear upon said shoulders, substantially as and for the purpose specified.

5. The combination of the combined eye and bail A, $a$, $a'$, B, and C, the spindle D, $d$, $d'$, and $d''$, and the driver E, $e$, $e'$, and $e''$, substantially as and for the purpose specified.

R. S. CATHCART.

Witnesses:
CHAS. FRED. TUCKER,
L. E. LOCKE.